(12) United States Patent
Spencer et al.

(10) Patent No.: US 8,542,720 B2
(45) Date of Patent: Sep. 24, 2013

(54) DETECTION OF OUTBOUND MESSAGE SIGNALS IN A POWER LINE TWO-WAY COMMUNICATIONS SYSTEM

(75) Inventors: Quentin H. Spencer, St. Louis, MO (US); John B. Hessling, Jr., St. Louis, MO (US); Benjamin A. Hammond, St. Louis, MO (US); Dennis L. Kelley, St. Charles, MO (US); David W. Rieken, St. Charles, MO (US); William J. Davis, St. Louis, MO (US); Michael R. Walker, II, St. Louis, MO (US)

(73) Assignee: Aclara Power-Line Systems, Inc., St. Louis, MN (US)

( * ) Notice: Subject to any disclaimer, the term of this patent is extended or adjusted under 35 U.S.C. 154(b) by 1007 days.

(21) Appl. No.: 12/596,987

(22) PCT Filed: Apr. 18, 2008

(86) PCT No.: PCT/US2008/060731
§ 371 (c)(1),
(2), (4) Date: Oct. 22, 2009

(87) PCT Pub. No.: WO2008/134257
PCT Pub. Date: Nov. 6, 2008

(65) Prior Publication Data
US 2010/0124288 A1     May 20, 2010

Related U.S. Application Data

(60) Provisional application No. 60/913,612, filed on Apr. 24, 2007.

(51) Int. Cl.
*H04B 1/38*     (2006.01)
*H04L 27/00*     (2006.01)
(52) U.S. Cl.
USPC ............ 375/219; 375/220; 375/295; 375/316

(58) Field of Classification Search
USPC ................. 375/295, 316, 324, 338, 339, 346, 375/347, 348, 354, 368, 219, 220, 222, 240.27, 375/240.26, 284, 285; 369/53, 35, 44, 69; 360/31, 53, 313; 324/210, 211, 212; 702/108, 702/115, 66, 67, 69, 79, 83, 124–126
See application file for complete search history.

(56) References Cited

U.S. PATENT DOCUMENTS 5,903,594 A    5/1999    Saulnier et al.
6,278,357 B1 *   8/2001    Croushore et al. ............ 375/259

(Continued)

*Primary Examiner* — Sam K Ahn
*Assistant Examiner* — Linda Wong
(74) *Attorney, Agent, or Firm* — Polster, Lieder, Woodruff, & Lucchesi, L.C.

(57) ABSTRACT

Improvements in the detection of TWACS outbound message signals. A first improvement involves matching some (or all) of the intermediate points in an outbound preamble occurring between bits of the preamble currently being detected. This reduces the possibility of a false synchronization and therefore decreases the probability of missing outbound message signals. A second improvement is to require some or all of the known preamble bits to exceed a predetermined threshold where both the thresh-old and which bits are adjustable. An additional approach is using 4-8 additional buffers in a transponder to detect preamble patterns in the outbound message. Each half cycle of the outbound message waveform requires entering a bit only into the buffers active for the particular frame of reference in which the message is being transmitted, since only buffers for that frame of reference are employed. The process continues until all bits specified to be sent, based on the length of the outbound message, are extracted. A CRC is then performed for the message. Using this method eliminates the problem of inbound messages being detected as outbound messages, and the resulting "blindness" of the transponder. It further makes the transponders less sensitive to noise which currently causes the transponder to detect a preamble when there is none, resulting in a valid outbound message being missed.

14 Claims, 2 Drawing Sheets

(56) References Cited

U.S. PATENT DOCUMENTS

| | | | |
|---|---|---|---|
| 6,671,311 B1* | 12/2003 | Raphaeli et al. | 375/142 |
| 7,881,607 B2* | 2/2011 | DeLew et al. | 398/17 |
| 2005/0105505 A1* | 5/2005 | Fishler et al. | 370/349 |
| 2006/0251069 A1* | 11/2006 | Cathey et al. | 370/389 |
| 2007/0217493 A1* | 9/2007 | Rhoads | 375/224 |
| 2008/0008153 A1* | 1/2008 | Hiben et al. | 370/344 |
| 2009/0022081 A1* | 1/2009 | Hagiwara et al. | 370/315 |
| 2009/0132650 A1* | 5/2009 | Tazzari et al. | 709/204 |

* cited by examiner

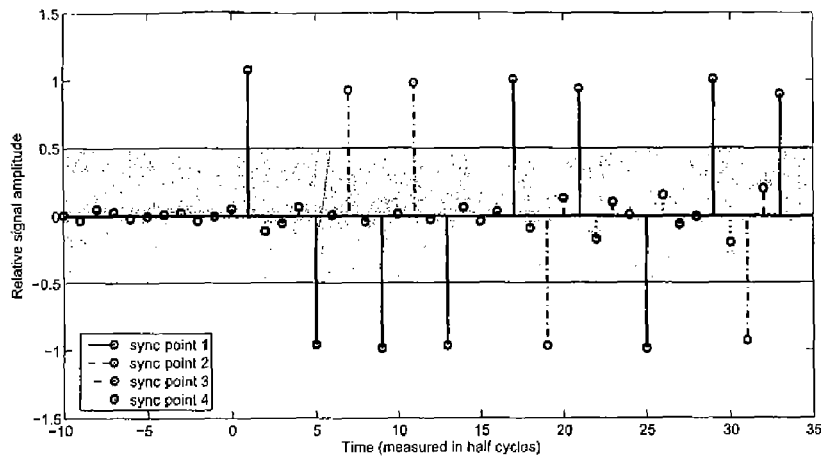
Figure 1: Illustration of a noisy outbound preamble sequence after passing through the filtering step.
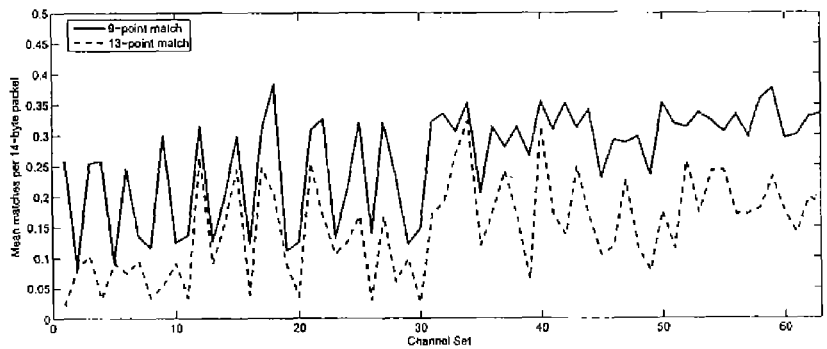
Figure 2: Mean number of false synchronizations per inbound message for all possible permutations of the 6 channels and 14-byte messages.
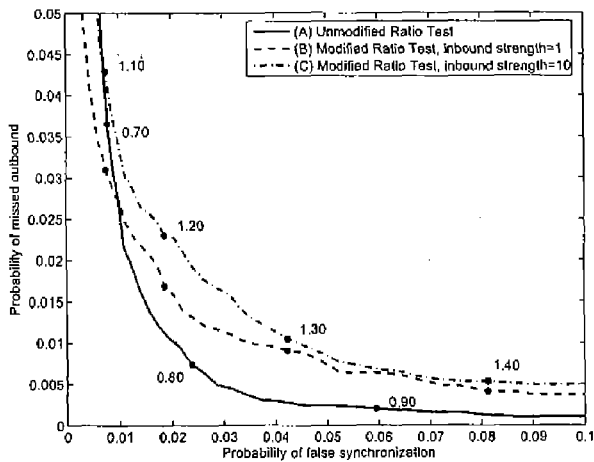
Figure 3: Performance of regular and modified zero/non-zero ratio tests in high noise conditions.

DETECTION OF OUTBOUND MESSAGE SIGNALS IN A POWER LINE TWO-WAY COMMUNICATIONS SYSTEM

CROSS REFERENCE TO RELATED APPLICATIONS

This application is the United States National Stage under 35 U.S.C. §371 of International Application Ser. No. PCT/US2008/060731 having an International Filing Date of Apr. 18, 2008, and is related to and claims priority to U.S. Provisional Patent Application No. 60/913,612, filed on Apr. 24, 2007 which are incorporated herein by reference.

STATEMENT REGARDING FEDERALLY SPONSORED RESEARCH

N/A

BACKGROUND OF THE INVENTION

This invention relates to a two-way automated communications system (TWACS) used by electrical utilities for sending messages from the utility to an end device, and for receiving and processing responses from the end device containing information relating to matters such as current energy consumption, power outages, etc. More specifically, the invention sets forth a method for improvement in the detection for outbound messages sent by the utility.

TWACS messages, which can be categorized as either outbound messages (OM) or inbound messages (IM), are sent and received over a selected phase (φ) of the electrical distribution system. When an outbound message is sent, the transponder detects the message and validates it using channel coding. As discussed hereinafter, synchronization to the outbound message signal involves matching a 9-bit preamble of the message against an expected bit pattern. It will be understood that synchronization does not necessarily mean the message detected by the transponder will pass error detection as part of the channel coding. Furthermore, because the entire message has not yet been received at the time of synchronization, the transponder must continue to detect bits until the end of the message is received. If the transponder erroneously detects what appears to be a preamble, it will attempt to detect the bits following the preamble, even if no signal is present. This can result in the missed detection of an outbound signal that occurs while the transponder is in the bit detection state.

Sometimes an erroneous preamble detection can be triggered in a transponder by random noise on the power line, but a far more likely cause is TWACS inbound signals. There is sufficient similarity between TWACS inbound signals and TWACS outbound signals that an inbound signal can contain a bit pattern that matches the preamble of an outbound message. Depending on system configuration, it is possible for such patterns to occur immediately before an outbound message is sent over the same phase as a particular transponder.

Similarly, a transponder can miss a TWACS outbound message when it is preceded by another outbound message. Consecutive outbound messages can be sent on the same phase or different phases. If a transponder incorrectly synchronizes to the first outbound message (due to other noise sources) the transponder is more likely to miss the second outbound message as well.

This problem is compounded because once a transponder synchronizes to a bit pattern that matches the outbound preamble, the transponder stops looking for any other preamble patterns. It will be understood that the bit pattern detected could be incorrect as well as correct. As the transponder continues processing what it now believes is an outbound transmission based upon synchronization to an incorrect bit pattern, a blind spot (time period) is created in the transponder. If a true outbound message is transmitted on the phase of the transponder during this period, it will miss the message because it is not looking for it during that time. The blind spot may last anywhere from a few bytes of TWACS outbound message time (for the shortest valid message), up to the maximum message size of 31 bytes. This corresponds to a range in time of between 2.13 seconds and 16.50 seconds.

While inbound signals are a common source of false outbound preambles that cause the outbound detector to miss true outbound signals, the problem can also be triggered by power line noise. When no signals are present and the transponder is hunting for a preamble, there is a certain probability that any random noise sequence will match the outbound preamble pattern. Again, this may result in the transponder processing what it believes is the outbound message without further watching for a true outbound message.

BRIEF SUMMARY OF THE INVENTION

The present disclosure is directed to improvements in a method of the detection of preamble patterns in TWACS outbound messages which benefit the likelihood of detecting a true TWACS outbound message. The first improvement includes matching some (or all) of the intermediate points in an outbound preamble waveform that occur between those bits currently being detected, in order to reduce the possibility of false synchronization and therefore decrease the probability of missing outbound messages. Tests have shown that this improvement significantly reduces the relative number of missed outbound messages.

Another approach is to utilize additional (2-8) buffers in a transponder for processing outbound messages concurrently, each buffer adding about 35 bytes of RAM each, while requiring a minimal amount of additional processing power. When an outbound message preamble is detected, the synchronization detector continues to search for additional outbound message preambles, and if additional preambles are detected, the associated bits are buffered using the additional buffers. The process continues until all bits associated with each message's preamble are collected. A cyclic redundancy check (CRC) is then performed to determine the validity of the collected bit pattern. Using this method significantly reduces the duration and frequency of any "blindness" of the transponder because the preamble searching continues until all buffers are full, even if an erroneous preamble is detected.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 1 is an illustration of a noisy outbound preamble sequence after passing through a filter;

FIG. 2 is a graph showing the probability of false synchronization of inbound signals for each of the 63 possible combinations for one of the six (6) channel sets used for TWACS inbound signaling as simulated under severe operating conditions;

FIG. 3 illustrates the performance of a zero/non-zero value ratio test for various threshold values;

DETAILED DESCRIPTION OF INVENTION

Figure 4:
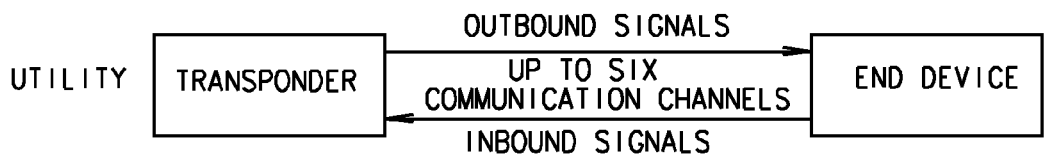
FIG. 4 is a simplified representation of a TWACS used by a utility.
Figure 5:
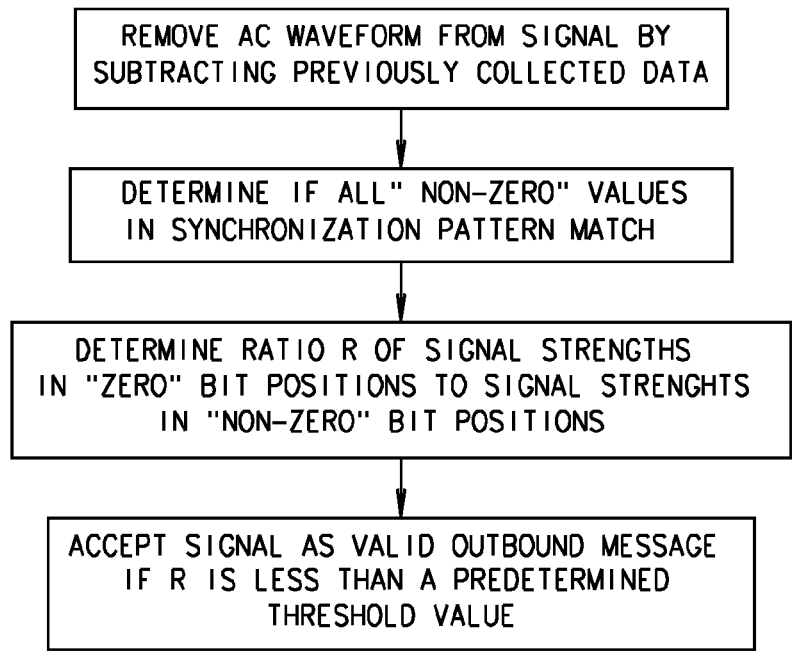
FIG. 5 is a flow chart of the method of the invention.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

The preamble of an outbound TWACS message consists of a 9-bit pattern 011100100, or 0E4 hexadecimal. The ones and zeroes are represented by putting a pulse on the first or third half cycle of the AC waveform near the zero crossing points. For a given outbound message all pulses are placed on either positive or negative half cycles. Accordingly, a TWACS outbound signal detector looks at all of the zero crossings. The following is a representative pulse pattern detected by a receiver. The top row is bit number; the middle row is the binary sequence; and, the bottom row is the pattern of pulses. A "1" represents the presence of a pulse and a "0" the absence thereof:

|  | bit | | | | | | | | |
| --- | --- | --- | --- | --- | --- | --- | --- | --- | --- |
|  | 1 | 2 | 3 | 4 | 5 | 6 | 7 | 8 | 9 |
| binary seq. | 0 | 1 | 1 | 1 | 0 | 0 | 1 | 0 | 0 |
| pulse pat. | 1 | 0100 | 0100 | 0100 | 0001 | 0001 | 0100 | 0001 | 0001 |

It will be understood by those skilled in the art that the leading zeros of the first bit (bit 1) are ignored in the above representation. To remove the AC waveform from the signal being processed, the receiver subtracts data collected one cycle earlier in the processing sequence from the waveform currently being processed. This can be done as a filtering operation, using filter coefficients of [1, 0, −1]. The output of this operation, as performed over the entire preamble is:

1000 −1010 −1010 −100010 −101000 −100010 −1010x

The x at the end of the pattern is indeterminate because it depends on the value of the next bit in the message sequence. It will be noted that the scale of the signal has not been considered, so that the values 1 and −1 are essentially "placeholders" for some arbitrary value that is either positive or negative. The sequence has a total length of 35 bits including the indeterminate bit at the end of the sequence.

FIG. 1 illustrates a noisy version of the preamble sequence, after filtering. As discussed hereafter, the bit rate is one bit for every four half-cycles; so four possible synchronization points are illustrated and labeled numerically in FIG. 1. In FIG. 1, synchronization point 1 is the correct alignment for the message being processed. If resulting bits are now extracted from the preamble, the resulting sequence is:

1 −1 −1 −1 1 1 −1 1
1 where a positive value (represented here by a 1) maps to a binary 0, and a negative value (represented here by a −1) maps to a binary 1. The outbound detection method previously used checks to verify if this pattern matches the expected pattern, and also checks to determine whether the bits exceed a predetermined threshold of signal strength. This threshold is illustrated in FIG. 1 by the gray region in the middle of the Figure, and is considered to be a "zero" region. That is, a signal falling within this region is assumed not to be an out-bound signal. This can be thought of as a quantization of the signal to one of 3 values, corresponding to 1, 0, and −1. In the past, the detector has not required that all preamble bits meet the threshold requirement, but recent tests have shown that this is effective in reducing false preamble detections. Further, using only every fourth value to evaluate the validity of a possible synchronization sequence ignores valuable information occurring between those values. As shown in FIG. 1, while reference frame 1 is the correct synchronization point, reference frames 2 and 4 are both near zero, and reference frame 3 contains a mixture of zero and non-zero values. Since all of these values are processed before the correct synchronization point is ascertained, an optimal false preamble rejection algorithm should take these values into account.

If intermediate values are included in the received preamble sequence, what essentially is being accomplished is trying to match a ternary sequence of length 33 (ignoring the indeterminate part at the end). However, because the amplitude of the signal is not known in advance, an optimal threshold between what constitutes a 0 and a 1 or −1 can only be determined adaptively. A simplified test to do this, for example, would be to take only those points where a 1 or −1 is expected to occur. By only requiring a 9-bit pattern match, one is effectively only matching 9 points out of 33. But, by requiring all non-zero locations to also match, 13 points are now being matched instead. Were completely random noise being processed, this would result in a reduction in false synchronizations by a factor of $2^4$ or 16. However, this is not necessarily true if the noise is caused by an inbound TWACS signal, which is not random.

Because inbound signals can easily be seen by the outbound detectors in transponders of the adjacent phases, it is important to be able to correctly reject patterns that may look similar to outbound message preambles, but are in fact part of inbound messages. After passing an inbound signal (or the sum of multiple inbound signals from multiple sources) through an outbound message filter, it is still possible for the result to match the non-zero portions of the preamble. However, because the pulse patterns in the inbound message signal are different from those in an outbound message, they contain non-zero information in places where the outbound message pattern should be zero. Therefore, a way of rejecting false synchronizations on inbound signals is to enforce some type of test on the other indices. One example of how to do this is to investigate the ratio of the signal energy level in places where a zero is expected to be, to the energy level in places where a one is expected. To define such a ratio, for the results of the filtering operation set forth above, let Z represent the set of indices that correspond to the places where there are expected values of zero; i.e.,

Z={2, 3, 4, 6, 8, 10, 12, 14, 15, 16, 18, 20, 22, 23, 24, 26, 27, 28, 30, 32}

Similarly, let N represent the indices that correspond to the places where there are expected non-zero values:

N={1, 5, 7, 9, 11, 13, 17, 19, 21, 25, 29, 31, 33}

If $d_i$ is the absolute value of the received signal at index i, let R represent the ratio of zero to non-zero signal strength. That is:

$$R = \frac{\sum_{i \in Z} d_i}{\sum_{i \in N} d_i} \quad (1)$$

Now, if R exceeds a predetermined threshold value, it will be rejected as not a true outbound message preamble. Based upon the simulation results presented below, an acceptable range of threshold values is in the range of 0.6 to 1.0.

This new synchronization method was tested on simulated inbound and outbound message signals. The noise level selected was relatively high in order to simulate severe operating conditions. In addition, the outbound signals were subjected to an impulse response that created leakage into the next two half cycles of the waveform, with a 20% leakage after one half cycle, and an additional 10% leakage after two half cycles. These conditions resulted in a 3% probability of an outbound message signal being missed altogether. This value is higher than what is generally seen in practice.

The inbound waveforms were generated for all possible combinations for the 6 channels in the TWACS inbound channel scheme, and include 6 permutations of 1 channel, 15 permutations of 2 channels, 20 permutations of 3 channels, 15 permutations of 4 channels, 6 permutations of 5 channels, and one permutation for all 6 channels. This results in a total of 63 possible combinations.

FIG. 2 shows the probability of a false synchronization on inbound signals for each of the 63 combinations. The plot contains the mean number of false synchronizations per inbound message for the traditional 9-point pattern matching, and the proposed 13-point pattern matching. In a few instances in FIG. 2, the reduction in false synchronizations achieved by the 13-point matching technique approaches the theoretical limit of 16 for a completely random input. On the other hand, there are two instances, channel 6 and channel 14, where all cases of matching the 9-point pattern also match the 13-point pattern. This is a peculiarity of the particular pulse patterns for those channels, although the probability of a false synchronization is already relatively low for them. Overall, the average reduction in false synchronizations is approximately 60%.

FIG. 3 shows the performance of the zero/non-zero value ratio test for various threshold values with the curve of interest being indicated A. The other two curves B and C are explained hereinafter. In FIG. 3, one axis represents the probability of erroneously accepting data in an inbound message as an outbound preamble, and the other axis represents the probability of erroneously rejecting a true outbound preamble. Under cleaner (i.e., less noisy) signal conditions than those used in the simulation, this curve tends to shift to the left as viewed in FIG. 3.

With the threshold set to a relatively conservative value of 1.0, the probability of falsely rejecting an outbound message was 0.1%. It will be noted that, at this noise level, the probability of missing a preamble due to just noise is 17%. At this level, only 6% of the places in inbound messages that would have been detected using traditional synchronization methods were able to pass both the 13-point pattern match and the zero/non-zero ratio test. With the noise level set so that existing detection methods missed 3% of outbound preambles, the probability of falsely rejecting an outbound message was reduced to 0.01%, and the inbound message acceptance percentage increased to 5%. This is a reduction, by a factor of 20, in the number of false preamble patterns that are accepted. The remaining false alarms can be substantially eliminated by use of a second detector; or, if resources do not permit, the threshold could be reduced to, for example, 0.9.

This false preamble rejection method has some elements that require substantially more memory than has been used in the past, which could make implementation in some transponders impractical. The main problem in this regard is that the ratio test to determine whether or not to reject a possible preamble is essentially a ratio of the outputs of two finite impulse response (FIR) filters. Implementing such filters requires that data be stored in a memory for the entire length of a filter, about 35 half-cycles. Since these filters are replicated several times in the transponder, each additional past value that must be stored for the filter results in a large increase in memory consumption.

Currently, average signal amplitude is computed for each of the four possible synchronization points using a first-order recursive filter which is updated at each step using the running average of previously entered values, plus the next new value. The averages are used to create a modified zero to non-zero ratio test. For example, let $x_n$ represent the input to the filter at half-cycle n. At each n, there are four filter outputs, $y_{n,1}$, $y_{n,2}$, $y_{n,3}$, and $y_{n,4}$. These represent the filtered outputs for the four synchronization points illustrated in FIG. 1. It will be noted that if the filtering function is a non-weighted average of the last 9 values, $y_{n,1}$ will contain a large output, $y_{n,2}$ and $y_{n,4}$ will have values close to zero, and $y_{n,3}$ will have a value somewhere in between. Given the above definitions, the ideal zero/non-zero ratio could be approximated with the ratio:

$$R = \frac{y_{n,1}}{y_{n,2} + y_{n,4}} \quad (2)$$

which is similar to the original definition of R in Equation (1) above, except that because some terms in both the numerator and denominator from the original definition are contained in $y_{n,3}$, it is removed completely from the approximation in Equation (2).

In practice, computing the filter outputs $y_{n,1} \ldots y_{n,4}$ as unweighted averages of previous inputs requires significant additional memory, so recursive averages can be used as an approximation. A simple first-order recursive average does not require any additional memory beyond the storage of the y values as $$y_n = x_n + \alpha y_{n-1}. \quad (3)$$

The value of $\alpha$ is an averaging constant that should be chosen to optimize rejection of false synchronization patterns. If it is now assumed that at half-cycle n, the 13-point pattern match is satisfied, then either the zero/non-zero amplitude ratio (Equation 1) or the approximate zero/non-zero amplitude ratio (Equation 2) is computed and compared to a predetermined threshold, in order to judge the likelihood that the received pattern actually represents an outbound preamble.

It should be noted that equation (1) represents an ideal case which requires extra memory, and equation (2) represents a simplified case which requires no extra memory. These examples are intended to be illustrative only, and not limiting. For example, in a situation where some additional memory is available, but not enough to implement equation (1), a different filtering operation than that illustrated in equation (3)

could be implemented that uses additional internal filter states to more closely approximate the filter response of equation (1).

One problem encountered using IIR filtering is that due to its infinite impulse response, the output of the filter will include past results that are older than the synchronization sequence. In FIG. 1, the only signal present prior to the outbound message preamble is low-level noise, which represents a best-case scenario. The worst-case scenario, when IIR filtering is used in computation of the ratio test, is when a very strong inbound message signal is received immediately prior to the preamble of an outbound message. For transponders sharing the same service transformer, the signal strength of the inbound message signal seen by the neighboring transponders can be many times greater than that of the outbound message signal. In constructing a worst-case scenario such as this for simulation purposes, it is assumed that inbound message signals are received on all 6 channels immediately before the outbound message signal of interest, and that each inbound message signal has an amplitude 10 times that of the outbound message signal. What this means is that the exponential decay of the IIR filter must be fast enough to discard or "forget" the effect of the inbound message signals prior to the end of the preamble of the outbound message. Empirical tests have shown that for use with the method of the invention, best performance is obtained using a value of $\alpha=0.5$. Using this value has an advantage in that the necessary computations can be performed using a simple bit shift operation.

Simulation results for the modified zero/non-zero ratio test are shown in FIG. 3. As indicated above, for the modified ratio test, a strong inbound message signal immediately precedes each outbound message signal. However, it should be noted that this has no effect on the non-modified ratio test because the inbound message signal has no IIR component. The curve B in FIG. 3 represents the situation where the inbound and outbound message signals are equal in amplitude; and, the curve C represents the situation where the inbound message signal is 10 times stronger than that of the outbound message signal. The relatively small gap between the curves indicates that the impulse response of the IIR filter approaches zero relatively quickly. The result is that there is only a minimal amount of "leakage" of data from previous signals into the ratio test. While the modified ratio test does not perform quite as well as the unmodified ratio test, given the substantial reduction in memory consumption required for the modified ratio test, the results nonetheless represent a significant gain over existing outbound message detector techniques.

One reason for sub-optimal performance of the reduced-memory modifications to the false preamble rejection is that non-zero intermediate values observed at synchronization point 3 ($y_{n,3}$) in FIG. 1 are not included. However, it is still possible with a reduced memory to test these values to some extent, because the quantized version (to a ternary value) of this data is still stored. Now, instead of matching the sign of 13 points in the data as a preliminary rejection criterion, the method can require that all 33 data points also fall into the correct bit strength range. That is, all values (and only those values) that are expected to have non-zero bit strength are required to exceed the predetermined threshold. A drawback to this method, at this time, is that the threshold is currently not adaptive and is therefore set relatively high. It is possible, in some instances, that a weak signal with a high level of noise may cause one of the non-zero points to be not strong enough, or that a short impulse noise source could cause a zero-valued point to exceed the threshold. Because of this, it is reasonable to allow for one or two processing errors, but tests have not yet been performed to determine what would be acceptable.

In summary, a received signal is assumed to be a valid synchronization pattern when the following criteria are satisfied:
a) All 13 non-zero values have the correct sign;
b) A predetermined subset of the non-zero values are expected to exceed a predetermined threshold
c) Most, or all, of the 33 values fall into the correct range with regard to the threshold for bit strength; and,
d) The ratio R as defined in Equation (1) or Equation (2) exceeds the prescribed threshold.

When a TWACS outbound message occurs on a different phase of the AC power line, the situation is referred to as "outbound crosstalk". Currently, transponders accept the outbound message rather than block it, because they cannot determine the difference between a TWACS outbound message on a different phase and a message on their own phase. If a transponder detects an outbound message that is actually crosstalk, it currently stops looking for another valid preamble in the outbound message for the calculated inbound message time period. If the TWACS' communication equipment (SCE) sends an outbound message on the same phase, that signal will be missed because the transponder is "blind" during the inbound message time period on the adjacent phase.

Since a basic problem is that many transponders are designed (or programmed) to stop searching for a new preamble pattern in an outbound message once a preamble pattern is found, another solution to the problem is to program the transponder to continue searching for preamble patterns even after one has been found. As discussed above, detectors in current transponders stop searching for a preamble pattern once one is found because the transponder has a limited amount of memory, and there is a limited amount of processing power available to the microprocessors used in the transponders. With the introduction of newer transponders having more powerful microprocessors, more memory, and greater processing speed, these limitations are relaxed.

Current outbound detectors employ a set of tables to track detected outbound message bits for fourteen (14) different detection ranges across four (4) different possible half-cycle alignments. Each bit of an outbound message signal is coded using four (4) consecutive half cycles of the AC waveform, which results in four (4) different frames of reference on which an outbound message OM can be found, so the detector must track each of the four (4) frames of reference. For each half cycle of the waveform, only one of the four (4) frames of reference is evaluated, so the bit rate for each frame of reference is one (1) bit for four (4) half cycles.

The tables also track the preceding eight (8) bits of a signal, both as to whether the bits appear as a 1 or a 0, as well as the signal strength of each bit. A 1 in the map indicates a signal strength greater, for example, than a threshold value of 25 µsec; while, a zero indicates a signal strength below this threshold. The tables also track a running average of the bits. In this regard, the signal strength of each bit is added to the average signal strength of the preceding bits, and the resulting sum is then divided by 2. This is done for all the ranges. When an outbound preamble is detected on one or more of the ranges for the frame of reference which is being evaluated for that particular half cycle, then processing for that frame of reference is halted. The detection range having the greatest running average signal strength is now selected as the best range, and from there on, for the remainder of the outbound message signal, only data for that range and frame of reference is calculated. If the signal strength for a bit is positive, it is detected as a 0; if the signal strength for that bit is negative, it is detected as a 1. The bits are then shifted into an outbound message buffer of the transponder until the number of bits specified in the outbound length portion of the message have all been detected. As each bit of the outbound message is detected, the detector then uses that information to determine how many more bits need to be received before attempting to validate the message using a CRC check code in order to generate a checksum for the outbound message used to detect errors in the message.

Using the method of the invention, no additional tables are needed and the transponders need only to continue searching for a preamble on all 14 ranges and on all 4 frames of reference. Several additional outbound message buffers are now used and these will require additional variables to describe what they are. One thing that will need to be known is on which frame of reference an outbound message preamble was detected for a buffer. Another thing that will need to be known is the detection range on which the outbound message preamble was detected. When enough of the message has been received to know the length of the outbound message, that information will be used to determine when to perform the CRC validation on that buffer. Another item required is a bit counter used to keep track of where the next detected bit goes.

Preferably, 4-8 outbound message buffers are required, with each buffer only adding about 35 bytes of RAM. The additional processing power required by the additional buffers to detect outbound is minimal. Each half cycle only requires storing a bit into as many buffers as are active for that frame of reference, and only the outbound message buffers for the current frame of reference need be managed. However, even if all 8 buffers were active for the same frame of reference, each buffer only needs to have the bit inserted into the buffer, and the bit count of the buffer updated. The process continues until all bits specified to be sent, based on the extracted outbound message length information, are received. Then, the CRC is evaluated for the message. It is important that calculation of the CRC not impact other processing which is on-going, so the searching for outbound preambles continues. Since the CRC check process is time consuming, it is done as each bit is received, instead of all at once after the last bit is detected. This increase in processing is proportional to the number of detectors.

Use of this method will significantly reduce the likelihood of TWACS inbound messages being detected as outbound preambles, with the resulting "blindness" of the transponder as previously described. It will also make the transponders more resistant to certain types of noise which currently cause it to detect an outbound preamble when there is none, and subsequently miss a valid outbound message. The changes required to affect this are relatively minimal, since all that needs to be selected is the number of additional outbound message buffers to be maintained. The number of additional buffers could even be variable and so allow a higher number of buffers to be used in transponders having a higher processing capability; with a fewer number being used the lower powered, slower speed units.

In view of the above, it will be seen that the several objects and advantages of the present disclosure have been achieved and other advantageous results have been obtained.

The invention claimed is:

1. In a two-way automatic communications system used by an electrical utility in which outbound messages are sent from the utility to an end device and inbound reply messages are sent from the end device back to the utility, the respective outbound and inbound messages being sent and received over the utility's power distribution system, a method for enabling a transponder to distinguish an outbound message from an inbound message of the outbound and inbound messages transmitted elsewhere on the two-way automatic communications system, comprising:

detecting a plurality of bits forming a preamble of the outbound message and extracting the plurality of bits, said detecting including detecting intermediate values included in a sequence of the plurality of bits in the preamble;

computing a ratio of signal strength for bit locations in the preamble where one bit value is expected to the signal strength for bit locations in the preamble where another bit value is expected; and, accepting the plurality of bits as a valid preamble for the outbound message if the computed ratio exceeds a predetermined value.

2. The method of claim 1 in which the outbound message is imposed on an AC waveform and characteristics of the AC waveform are removed from the plurality of bits by subtracting data collected in one processing cycle from that collected in an earlier cycle.

3. The method of claim 2 further including checking the plurality of bits extracted from the outbound message to determine if a predetermined threshold of signal strength is exceeded.

4. The method of claim 3 further in which only a predetermined set of the plurality of bits are required to exceed the predetermined threshold of signal strength.

5. The method of claim 1 in which the ratio R of the signal strength of the bits with one value compared to the signal strength of the bits with the other value is defined as:

$$R = \frac{\sum_{i \in Z} d_i}{\sum_{i \in N} d_i}$$

where Z comprises a set of bit locations in the preamble where the bits of the one value occur, N comprises a set of bit locations in the preamble where the bits of the other value occur, and di is a received signal strength at an index i; if the ratio does not exceed a predetermined threshold value, the plurality of bits are rejected as not a valid outbound message preamble.

6. The method of claim 5 in which the plurality of bits have a value of 0 or 1 and the ratio R is the ratio of zero bits to non-zero bit for the plurality of bits in the preamble.

7. The method of claim 5 in which a range of values for the ratio is 0.6 to 1.0.

8. The method of claim 2 in which an average signal amplitude for the plurality of bits is computed for a plurality of possible points of synchronization and the ratio is determined using the average signal amplitude.

9. The method of claim 8 in which the average signal amplitude is computed using a recursive filter.

10. The method of claim 8 in which the average signal amplitude is computed for each of four possible synchronization points and the ratio R of the signal strength of the bits is defined as $$R = \frac{y_{n,j}}{y_{n,k} + y_{n,l}}$$

where $y_{n,j}$, $y_{n,k}$, and $y_{n,l}$ are the average signal amplitudes for various synchronization points of the plurality of possible points of synchronization on the waveform, where i,n,k,l are integers.

11. The method of claim 10 in which the averages signal amplitudes of the four possible synchronization points are unweighted averages, created using finite impulse response (FIR) filters.

12. The method of claim 10 in which the averages signal amplitudes of the four possible synchronization points are recursive averages, created using infinite impulse response (IIR) filters.

13. The method of claim 9 in which an averaging function for computing the averages signal amplitudes of the four possible synchronization points is defined as:

$$y_n = x_n + \alpha y_{n-1}$$

where $\alpha$ is an averaging constant $x_n$ is an input of the recursive filter $y_{n-1}$ as a previous average signal amplitude and $y_n$ is a current average signal amplitude.

14. In a two-way automatic communications system used by an electrical utility in which outbound messages are sent from the utility to a consumer and inbound reply messages are sent from the consumer back to the utility, the respective outbound and inbound messages being sent and received over the utility's power distribution system, a method for enabling a transponder to distinguish an outbound message from an inbound message of the outbound and inbound messages transmitted elsewhere on the two-way automatic communications system, comprising:

detecting a plurality of bits forming a preamble of the outbound message and extracting the plurality of bits, said detecting including detecting intermediate values included in a sequence of plurality of bits in the preamble;

computing a ratio of signal strength for bit locations in the preamble where a "0" bit is expected to the signal strength for bit locations in the preamble where a "1" bit is expected; and, accepting the sequence of plurality of bits as the preamble for the outbound message if:

a) all of the "1" bits in the preamble are of a correct sign;
b) the value of all the sequence of bits fall into a correct range of values for bit strength; and,
c) a ratio $$R = \sum_{i \in Z} d_i \Big/ \sum_{i \in N} d_i$$

exceeds a predetermined threshold value wherein Z comprises a set of bit locations in the preamble where the signal amplitude is expected to be near zero, N comprises a set of bit locations in the preamble where the signal amplitude is expected to be non-zero, and $d_i$ an absolute value of the received signal at an index i, wherein i is an integer.

* * * * *